(12) United States Patent
Shen et al.

(10) Patent No.: US 8,771,890 B2
(45) Date of Patent: Jul. 8, 2014

(54) FUEL SUPPLY CONTROL METHOD AND SYSTEM FOR FUEL CELLS

(75) Inventors: Sheng-Yong Shen, Taoyuan County (TW); Lan-Feng Chang, Taoyuan County (TW); Ku-Yen Kang, Hsinchu (TW); Chiou-Chu Lai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 993 days.

(21) Appl. No.: 11/437,100

(22) Filed: May 19, 2006

(65) Prior Publication Data

US 2006/0286421 A1 Dec. 21, 2006

(30) Foreign Application Priority Data

Jun. 16, 2005 (TW) .............................. 94119975 A

(51) Int. Cl.
*H01M 8/04* (2006.01)
*H01M 8/00* (2006.01)

(52) U.S. Cl.
USPC ........... 429/428; 429/433; 429/442; 429/443; 429/513; 429/515; 429/535

(58) Field of Classification Search
USPC .............. 429/13, 20, 24, 428, 429, 433, 442, 429/443, 448, 449, 513, 515, 535
See application file for complete search history.

(56) References Cited

U.S. PATENT DOCUMENTS

| | | | |
|---|---|---|---|
| 6,383,670 B1 * | 5/2002 | Edlund et al. | 429/20 |
| 6,410,175 B1 * | 6/2002 | Tillmetz et al. | 429/13 |
| 6,488,837 B1 | 12/2002 | Ren et al. | |
| 6,589,671 B1 | 7/2003 | Kehrer | |
| 6,589,679 B1 | 7/2003 | Acker et al. | |
| 6,698,278 B2 | 3/2004 | Zhang et al. | |
| 6,777,116 B1 * | 8/2004 | Muller et al. | 429/15 |
| 2002/0076589 A1 | 6/2002 | Bostaph et al. | |
| 2002/0122966 A1 * | 9/2002 | Acker et al. | 429/24 |
| 2003/0110841 A1 * | 6/2003 | Zhang et al. | 73/61.76 |
| 2004/0001989 A1 * | 1/2004 | Kinkelaar et al. | 429/34 |
| 2004/0247963 A1 * | 12/2004 | Akiyama et al. | 429/22 |

FOREIGN PATENT DOCUMENTS

WO WO 01/35478 5/2001

* cited by examiner

*Primary Examiner* — Muhammad Siddiquee

(57) ABSTRACT

The invention provides a fuel supply control system for fuel cells, controlling fuel concentration in a fuel unit. The fuel supply control system comprises a first thermal meter detecting a system temperature of the fuel cell, a fuel supply device comprising a fuel tank storing highly concentrated fuel and a fuel deliver device delivering fuel from the fuel tank to the fuel unit to adjust fuel concentration thereof, and a controller calculating a difference between a predetermined and an environmental temperature, generating a first velocity by adjusting the predetermined fuel supply velocity according to the temperature difference, and setting the delivery velocity of the fuel delivering device according to the first velocity.

15 Claims, 2 Drawing Sheets

FUEL SUPPLY CONTROL METHOD AND SYSTEM FOR FUEL CELLS

BACKGROUND OF THE INVENTION

1. Field of the Invention

The invention relates to a fuel cell, and in particular to a fuel supply control system for a fuel cell system, controlling fuel concentration in a fuel unit according to a system temperature of the fuel cell system.

2. Description of the Related Art

As fuel is consumed in a fuel cell, not only volume but concentration of the fuel is decreased, with optimum, operation requiring control of fuel supply concentration.

Conventional fuel supply methods for fuel cells, such as those disclosed in U.S. Pat. No. 6,488,837, US2002/076589A1, and WO01/35478, supply fuel or water according to fuel concentration measured from a fuel cell. Another fuel supply method for fuel cells, disclosed by Ballard Power in U.S. Pat. No. 6,698,278B2, supplies fuel according to fuel concentration calculated using temperature and electrical current measured from a fuel cell.

FIG. 1 is a block diagram of a conventional fuel cell 10 comprising a fuel supply control system 11, a fuel cell module 111, a pump 112, and a fuel unit 118 storing fuel with concentration maintained within a certain range. Pump 112 delivers the fuel to fuel cell module 111 for reaction with an anode.

Fuel supply control system 11 controls fuel concentration in fuel unit 118, and comprises a concentration meter 117, a controller 115, and a fuel supply device 12. Concentration meter 117 detects fuel concentration in fuel unit 118. Controller 115 calculates the difference between the measured concentration and a standard concentration, and drives fuel supply device 12 to deliver high concentration fuel to fuel unit 118 according to the concentration difference, such that fuel concentration in fuel unit 118 is maintained at a standard.

Fuel supply device 12 comprises a fuel tank 113 storing high concentration fuel and a fuel deliver device 114 delivering fuel from fuel tank 113 to fuel unit 118. In other designs, a water tank or a fuel tank storing low concentration fuel may be required if fuel concentration in fuel tank 113 is too high. However, in general, recycled water from a cathode unit of the fuel cell system is sufficient for the same function.

Devices for detection of the fuel concentration suffer: difficulty in achieving accuracy and high cost. For example, apparatus disclosed in U.S. Pat. No. 6,589,679 utilizes another fuel cell to measure the fuel concentration in a main fuel cell, whereby various factors, such as temperature change, impurities in fuel, and age of devices, may affect measurement accuracy. That disclosed by Ballard Power provides better reference in the field, although complex functions must be generated based on experiments with various sizes of fuel cell systems, with function varying in every system design. Accurate fuel concentration in such complex systems is a challenge.

BRIEF SUMMARY OF THE INVENTION

The invention provides a fuel supply control system for fuel cells, controlling fuel concentration in a fuel unit. The fuel supply control system comprises a first thermal meter detecting a system temperature of the fuel cell, a fuel supply device comprising a fuel tank storing high concentration fuel and a fuel delivering device deliver the fuel to the fuel unit to adjust fuel concentration thereof, and a controller comprising a predetermined fuel supply velocity, calculating a difference between the predetermined and environmental temperatures, generating a first velocity by adjusting the predetermined fuel supply velocity according to the temperature difference, and controlling the delivery velocity of the fuel deliver device according to the first velocity.

The invention further provides a fuel supply control method for fuel cells, utilizing a fuel tank storing high concentration fuel and a fuel deliver device delivering the fuel from the fuel tank to a fuel unit to adjust fuel concentration thereof. The fuel supply control method comprises setting a predetermined fuel supply velocity, setting a predetermined temperature, detecting a system temperature of the fuel cell, calculating a difference between the predetermined and environmental temperatures, generating a first velocity by adjusting the predetermined fuel supply velocity according to the temperature difference, and controlling the delivery velocity of the fuel deliver device according to the first velocity.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In a fuel cell system, if fuel concentration is too low, fuel crossover rate through the membrane from anode to cathode side is correspondingly low, such that temperature of the fuel cell remains at environmental temperature. As fuel concentration increases, combustion reaction in the cathode side within the fuel cell increases due to more fuel crossover and thermal energy is released such that the temperature of the fuel cell increases. A system temperature of the fuel cell, at which fuel concentration thereof is maintained at a fixed ideal value and the fuel cell operates at optimum, is measured as a predetermined temperature. When the system temperature of the fuel cell is not equal to the predetermined temperature, fuel supply velocity to the fuel cell is adjusted to alter the fuel concentration such that the system temperature is maintained at the predetermined temperature. Typically, the operating fuel concentration, and in turn, system temperature of the fuel cell, require no limitation to a precise value but are allowed within an operational range. A range with an upper and a lower limit of the predetermined temperature can also be determined. When temperature of the fuel cell is beyond the range, the fuel supply velocity must be adjusted.

Figure 1:
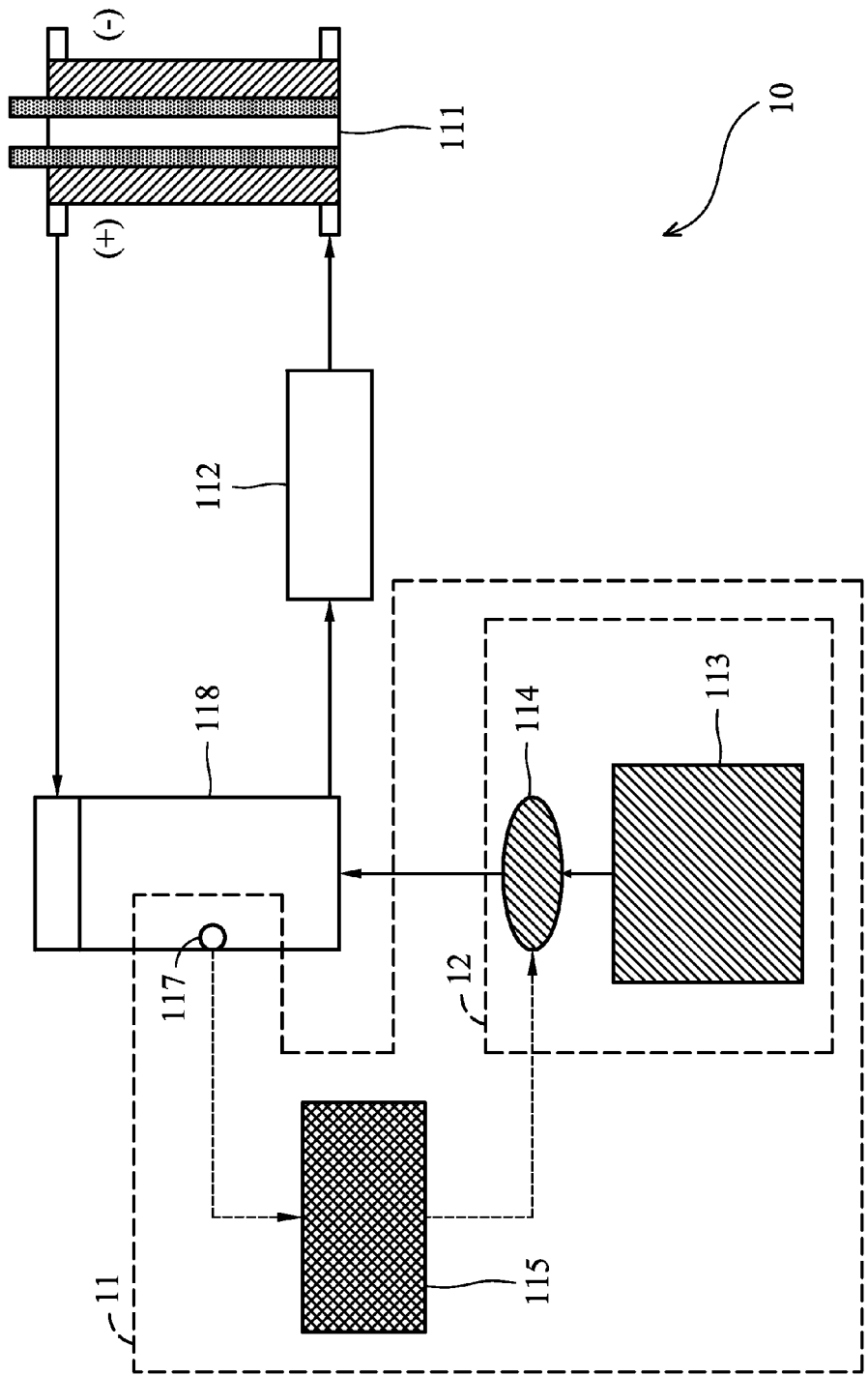
FIG. 1 is a block diagram of a conventional fuel cell.
Figure 2:
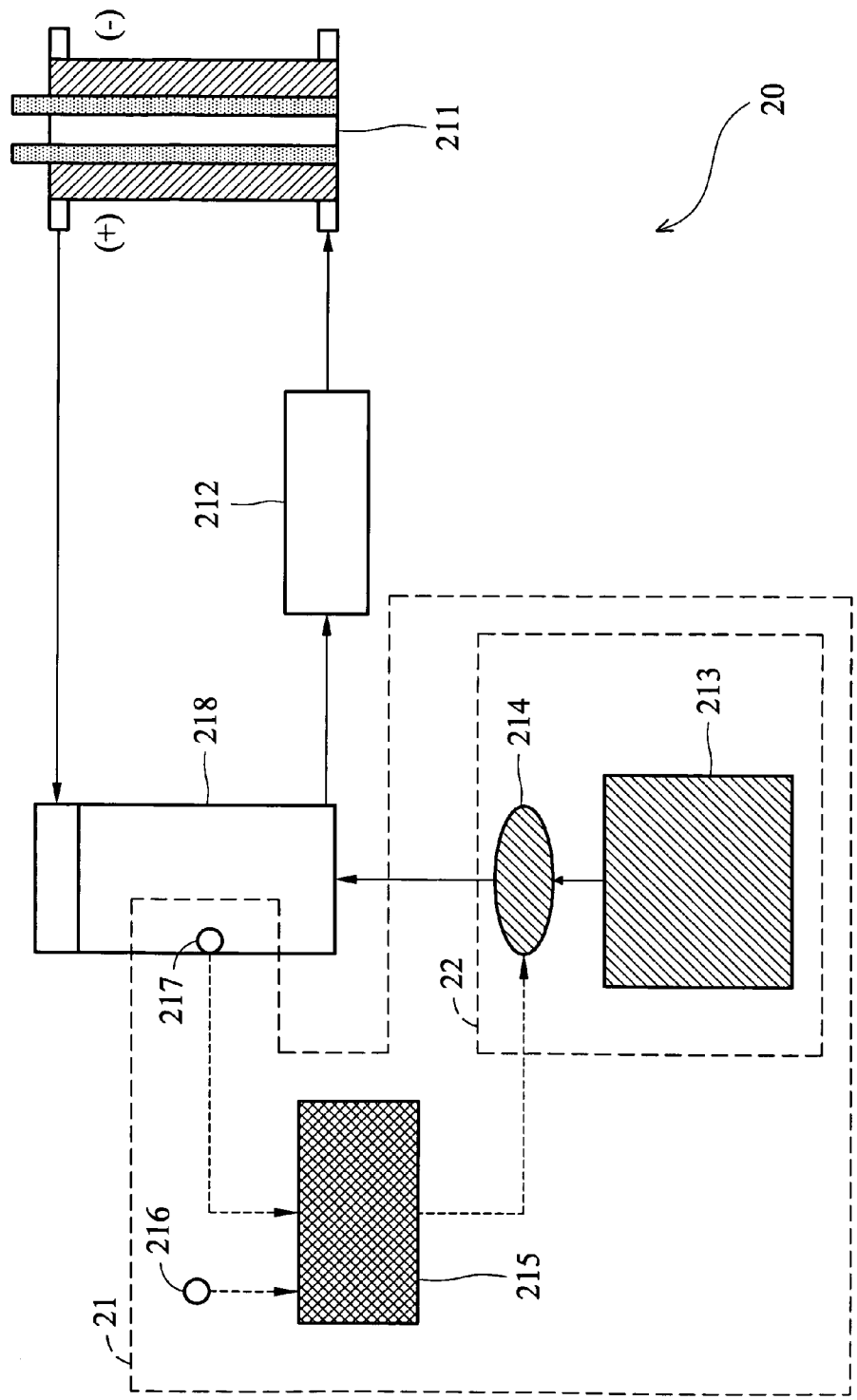
FIG. 2 is a block diagram of a fuel cell according to an embodiment of the invention.

FIG. 2 is a block diagram of a fuel cell 20 according to an embodiment of the invention, comprising a fuel supply control system 21, a fuel cell module 211, a pump 212, and a fuel unit 218 storing fuel, concentration of which is maintained within a certain range for the fuel cell 20 to operate at optimum. Pump 212 delivers the fuel to fuel cell module 211 for reaction with an anode.

Fuel supply control system 21 controls fuel concentration in fuel unit 218, and comprises a first thermal meter 217, a controller 215, and a fuel supply device 22. First thermal meter 217 detects a system temperature in fuel unit 218. Fuel supply device 22 comprises a fuel tank 213 storing highly concentrated fuel and a fuel deliver device 214 delivering the fuel from the fuel tank 213 to the fuel unit 218.

Controller 215 calculates a difference between the system temperature and a predetermined temperatures, generates a first velocity by adjusting a predetermined fuel supply velocity according to the temperature difference, and drives the fuel deliver device 22 to deliver highly concentrated fuel to fuel unit 218 according to the first velocity, such that fuel concentration in fuel unit 118 is maintained at standard.

Controller 215 can utilize an analog-to-digital converter (not shown) to convert a voltage signal of the first thermal meter 217 to a system temperature reading, and a subtractor or other logic device (not shown) to calculate the first velocity. The predetermined temperature can be set between 30° C. and 80° C., according to operational conditions of the fuel cell 20. In general, the predetermined fuel supply velocity is one to seven times a fuel supply velocity required by fuel cell to generate a current.

Controller 215 can further comprise upper and lower limits for the temperature difference with the first velocity set as the predetermined fuel supply velocity, when the temperature difference is within the upper and lower limits. The first velocity is generated by decreasing the predetermined fuel supply velocity when the temperature difference exceeds the upper limit, and by increasing the predetermined fuel supply velocity when the temperature difference is lower than the lower limit. Theoretically, when the upper limit is lower than 20° C., and the lower limit exceeds −20° C., fuel cell system can operate within specification. Experimental data shows optimum fuel cell between 10° C. and −10° C.

Fuel supply control system 21 can further comprise a second thermal meter 216 detecting an environmental temperature of the fuel cell, with the predetermined temperature set to exceed the environmental temperature by at least 5° C.

By implementing embodiments according to the invention, fuel concentration of the fuel cell can be maintained for optimum performance of the fuel cell.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fuel supply control system for a fuel cell, controlling the temperature of the fuel cell to be within a predetermined range, comprising:
a first thermal meter detecting a system temperature of a fuel unit;
a fuel supply device comprising a fuel tank storing highly concentrated fuel and a fuel deliver device delivering the fuel from the fuel tank to the fuel unit at a non-zero delivery velocity during operation of the fuel cell, wherein the delivery velocity is by default a non-zero predetermined fuel supply velocity; and
a controller programmed to calculate a difference between a predetermined temperature and the system temperature of the fuel unit, and to adjust the delivery velocity to a non-zero first velocity according to the temperature difference, wherein the predetermined temperature is a temperature at which the fuel cell operates at optimum;
wherein the predetermined fuel supply velocity is one to seven times a fuel supply velocity required by the fuel cell to generate a current;
wherein the first velocity is generated by decreasing the predetermined fuel supply velocity when the temperature difference exceeds an upper limit, and by increasing the predetermined fuel supply velocity when the temperature difference is lower than a lower limit.

2. The fuel supply control system as claimed in claim 1, wherein the predetermined temperature is between 30° C. and 80° C.

3. The fuel supply control system as claimed in claim 1, further comprising a second thermal meter detecting an environmental temperature of the fuel cell, wherein the predetermined temperature is set to exceed the environmental temperature by at least 5° C.

4. The fuel supply control system as claimed in claim 1, wherein the upper limit is lower than 20° C.

5. The fuel supply control system as claimed in claim 1, wherein the upper limit is 10° C.

6. The fuel supply control system as claimed in claim 1, wherein the lower limit exceeds −20° C.

7. The fuel supply control system as claimed in claim 1, wherein the lower limit is −10° C.

8. A fuel supply control method for a fuel cell, utilizing a fuel tank storing highly concentrated fuel and a fuel deliver device delivering the fuel from the fuel tank to a fuel unit at a non-zero delivery velocity during operation of the fuel cell, so as to adjust the temperature of the fuel cell to be within a predetermined range, comprising:
setting the delivery velocity of the fuel to the fuel unit to a non-zero predetermined fuel supply velocity to replenish the fuel that is consumed during operation;
setting a predetermined temperature at which the fuel cell operates at optimum;
detecting a system temperature of the fuel unit;
calculating a difference between the predetermined temperature and the system temperature of the fuel unit;
setting upper and lower limits for the temperature difference; and
adjusting the delivery velocity to a non-zero first velocity according to the temperature difference;
wherein the predetermined fuel supply velocity is one to seven times a fuel supply velocity required by the fuel cell to generate a current;
wherein the first velocity is generated by decreasing the predetermined fuel supply velocity when the temperature difference exceeds the upper limit, and by increasing the predetermined fuel supply velocity when the temperature difference is lower than the lower limit.

9. The fuel supply control method as claimed in claim 8, further comprising detecting an environmental temperature of the fuel cell, wherein the predetermined temperature is set to exceed the environmental temperature by at least 5° C.

10. The fuel supply control system as claimed in claim 8, wherein the upper limit is lower than 20° C.

11. The fuel supply control method as claimed in claim 8, wherein the upper limit is 10° C.

12. The fuel supply control method as claimed in claim 8, wherein the lower limit exceeds −20° C.

13. The fuel supply control method as claimed in claim 8, wherein the lower limit is −10° C.

14. The fuel supply control system as claimed in claim 1, further comprising a second thermal meter detecting an environmental temperature of the fuel cell, wherein the predetermined temperature is set according to the environmental temperature, and the controller dynamically increases and decreases the delivery velocity of the fuel deliver device according to the temperature difference.

15. The fuel supply control method as claimed in claim 8, further comprising detecting an environmental temperature of the fuel cell, wherein the predetermined temperature is set according to the environmental temperature, including the steps of dynamically increasing and decreasing the delivery velocity of the fuel delivery device according to the temperature difference.

* * * * *